H. H. HOWARD AND S. FURMIDGE.
SPRING MECHANISM FOR FRONT AXLES FOR AUTOMOBILES.
APPLICATION FILED NOV. 26, 1920.
1,400,604.
Patented Dec. 20, 1921.
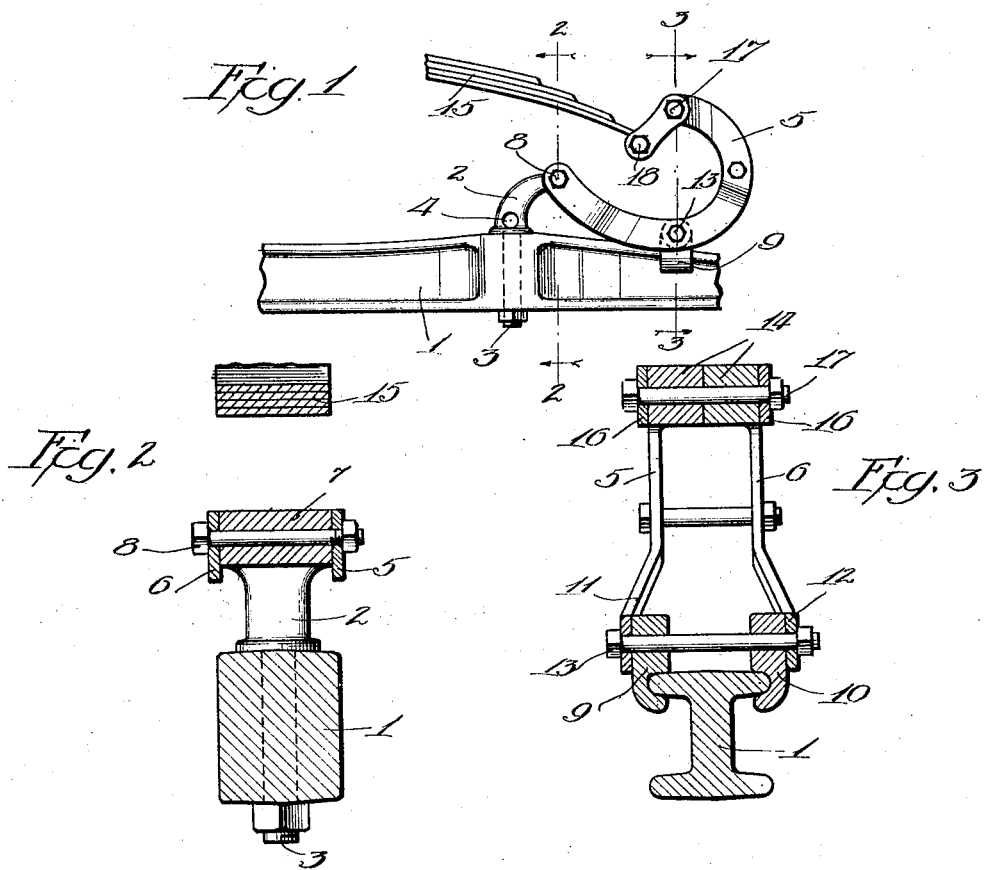

UNITED STATES PATENT OFFICE.

HERBERT H. HOWARD AND SAMUEL FURMIDGE, OF CHICAGO, ILLINOIS, ASSIGNORS, BY DIRECT AND MESNE ASSIGNMENTS, TO STEEL WINGS COMPANY, A CORPORATION OF ILLINOIS.

SPRING MECHANISM FOR FRONT AXLES FOR AUTOMOBILES.

1,400,604.  Specification of Letters Patent.  Patented Dec. 20, 1921.

Application filed November 26, 1920. Serial No. 426,474.

*To all whom it may concern:*

Be it known that we, HERBERT H. HOWARD and SAMUEL FURMIDGE, citizens of the United States, residing at Chicago, county of Cook, State of Illinois, have invented a certain new and useful Improvement in Spring Mechanism for Front Axles for Automobiles, and declare the following to be a full, clear, and exact description of the same, such as will enable others skilled in the art to which it pertains to make and use the same, reference being had to the accompanying drawings, which form a part of this specification.

The supporting spring between the front end of a Ford automobile and the front axle is made very short with the result that the automobile is not effectively cushioned at the front end.

The object of the present invention is to provide simple and novel means whereby a much longer spring can readily be substituted for the short front spring of the Ford automobile.

The various features of novelty whereby our invention is characterized will hereinafter be pointed out with particularity in the claim; but, for a full understanding of our invention and of its objects and advantages, reference may be had to the following detailed description taken in connection with the accompanying drawing, wherein:

Figure 1 is a side elevation of a fragment of the front axle of a Ford automobile and the supporting means for one end of the spring;

Fig. 2 is a section on an enlarged scale taken approximately on line 2—2 of Fig. 1; and Fig. 3 is a section on the same scale as Fig. 2, taken approximately on line 3—3 of Fig. 1.

Referring to the drawing, 1 represents the front axle of a Ford automobile and 2 the post-like spring hanger having a stem, 3, extending through the axle. In most of the Ford automobiles the radius rods are connected to the hangers, a hole, 4, being provided in each hanger to receive the front end of one of the rods; and it is therefore necessary, in this type of automobile, to retain the hanger in such a position that the opening for the radius rod will be properly located, regardless of the manner in which the spring is supported.

In accordance with the present invention there is provided a second hanger member, roughly C-shaped in cross section; this second hanger member being adapted to lie on the axle in a vertical plane, with one end secured to the hanger 2 and the other end supporting the spring. In the arrangement shown, this second hanger consists of two similar bars or plates, 5 and 6, corresponding ends of which lie on opposite sides of the boss or head, 7, at the upper end of the hanger 2 and are secured to the latter by means of a bolt, 8. The hangers, 2, in this type of construction are curved or horn-shaped, the tip being nearer the longitudinal center of the automobile than the base. Before applying our improved device, the hanger, 2, is turned through an angle of 180 degrees so as to carry the tip outwardly toward the corresponding front wheel. In order to secure the hanger members 5 and 6 to the axle, we provide a suitable clamping device at the points where the hanger members approach the axle. This clamping device may conveniently consist of two blocks, 9 and 10, shaped to fit over the flanges of the I section of the axle and project upwardly from the axle. The members 5 and 6 are spread apart in the vicinity of the clamping device, as illustrated at 11 and 12, so as to lie outside of the clamping blocks. A bolt, 13, is then passed through the parts 11 and 12 of the second hanger and through the clamping blocks, above the axle, clamping the parts of the attachment together and securing them rigidly to the axle.

The members 5 and 6 are so shaped that when they are positioned as heretofore explained, the free ends lie above and closer to the corresponding outer end of the axle than the ends which are attached to the main hanger. The free ends of the secondary hanger members are provided with bosses, 14, projecting toward and engaging with each other so as to give a transverse width or thickness to the free end of the secondary hanger equal to the length of the hub or boss, 7, on the hanger 2 and equal to the width of the automobile spring, 15. The automobile spring, 15, is then hung from the free end of the secondary hanger by means of the usual shackles or links, 16; a bolt, 17, passing through one end of each of these shackles or links and the free end of the secondary hanger; and the spring being hung from the other ends of the shackles or links, in the usual way, by a bolt or pin, 18.

It will be seen that the spring 15 is much longer than the ordinary spring hung from shackles or links carried by the post or hanger, 2, positioned, as is customary, with its tip directed toward the longitudinal axis of the automobile. It will also be seen that no change need be made in the axle and no hole need be drilled or part cut away to weaken the same in order to permit the application of the long spring.

While we have illustrated and described only a single preferred form of our invention, we do not desire to be limited to the exact structural details thus illustrated and described; but intend to cover all forms and arrangements which come within the terms employed in the definitions of our invention constituting the appended claim.

We claim:

In combination, an axle, a main hanger projecting upwardly from the axle near one end of the latter, a spring arranged above the hanger and having its end projecting past the hanger toward said end of the axle, and a secondary hanger secured at one end to said main hanger and engaged with the axle at a point between the main hanger and said end of the axle, the other end of the secondary hanger being curved upwardly past said end of the spring, and a suspending means between the latter end of the secondary hanger and the end of the spring.

In testimony whereof, we sign this specification.

HERBERT H. HOWARD.
SAMUEL FURMIDGE.